(12) United States Patent
Degura

(10) Patent No.: US 6,493,122 B1
(45) Date of Patent: Dec. 10, 2002

(54) OPTICAL SPACE COMMUNICATION APPARATUS

(75) Inventor: Yasusaburo Degura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/146,337

(22) Filed: Sep. 2, 1998

(30) Foreign Application Priority Data

Sep. 9, 1997 (JP) .............................................. 9-260978

(51) Int. Cl.$^7$ .............................................. H04B 10/00
(52) U.S. Cl. ....................... 359/159; 359/142; 359/152; 359/172
(58) Field of Search ................................ 359/172, 159, 359/152, 142, 173

(56) References Cited

U.S. PATENT DOCUMENTS

| | | | |
|---|---|---|---|
| 3,705,986 A | 12/1972 | Sanders et al. | ............ 250/199 |
| 5,818,619 A | * 10/1998 | Medved et al. | ............ 359/172 |
| 5,822,099 A | 10/1998 | Takamatsu | ................. 359/153 |
| 5,983,068 A | * 11/1999 | Tomich et al. | ............... 455/3.1 |

FOREIGN PATENT DOCUMENTS

| | | |
|---|---|---|
| DE | 4433896 | 11/1995 |
| FR | 2124680 | 9/1972 |
| GB | 2131245 | 6/1994 |
| JP | 9-69816 | 3/1997 |

OTHER PUBLICATIONS

A. Sander, "Atmospheric Optical Communications Systems and Applications", Laser Und Elektro–Optik, Jun. 1974, West Germany, vol. 6, No. 2, pp. 22–26.

* cited by examiner

Primary Examiner—Kinfe-Michael Negash
(74) Attorney, Agent, or Firm—Fitzpatrick, Cella, Harper & Scinto

(57) ABSTRACT

In an optical space communication system, a remote controller is provided at an arbitrary position remote from an optical space communication apparatus. The optical space communication apparatus is provided with an interface device for exchanging status information of the operating apparatus, operation start setup/manipulation information or operating setup/manipulation information of the apparatus with the interface device. Communication between the remote controller and the interface device is made for a transmission light power, a transmission signal power, a reception light power, a reception signal power, a light beam transmission angle, a temperature of a predetermined portion in the apparatus, an angular error between the reception light and an optical axis of a light reception unit in the apparatus, a transmission light beam divergence angle or the like.

18 Claims, 7 Drawing Sheets

OPTICAL SPACE COMMUNICATION APPARATUS

BACKGROUND OF THE INVENTION

1. Field of the Invention

The present invention relates to an optical space communication apparatus for performing optical radio information communication using a remote control means.

2. Related Background Art

A conventional optical space communication apparatus for performing optical radio information communication is generally installed on the rooftop of a building or the like so as to clear any obstructing objects from the space between itself and an opposing apparatus separated by a predetermined distance. As shown in FIG. 1, optical space communication apparatuses 1 and 2 are installed on the rooftops of buildings to face each other. For example, a displaying unit for displaying operating states such as optical reception power, a setup unit for setup the divergence angle of a transmission light beam, and the like, a manipulating unit for adjusting the transmission angle of the light beam, and the like are arranged on the rear surface of each of the apparatuses 1 and 2.

When the optical space communication apparatuses 1 and 2 are installed on the rooftops or the like as described above, the operation personnel must go to the rooftop and confirm the operating state of the apparatus 1 or 2 using indicators mounted on the apparatus 1 or 2. When the apparatus 1 or 2 must be installed in a place which makes it difficult to access depending on the situation, it is very difficult to confirm the operating state of the apparatus 1 or 2.

To solve this problem, an optical space communication apparatus as shown in FIG. 2 is known. Referring to FIG. 2, a main body head unit 3 is functionally separated from a manipulating control unit 4, the main body head unit 3 is installed on the rooftop, and the manipulating control unit 4 which performs signal processing is installed indoors to perform optical communication. In this apparatus, the main body head unit 3 is connected to the manipulating control unit 4 via a coaxial cable 5. In the opposing apparatus, similarly, a main body head unit 6 is connected to a manipulating control unit 7 through a coaxial cable 8.

With the above arrangement, transmission data signals or preliminarily modulated transmission data signals, power supply information, operation start setup/manipulating information, and setup/manipulating information during operation are input from the manipulating control units 4 and 7 to the main body head units 3 and 6. The main reception data signals, preliminarily modulated reception signals, and information representing the states of the main body head units 3 and 6 are input from the main body head units 3 and 6 to the manipulating control units 4 and 7. The manipulating control units 4 and 7 installed indoors mainly display the operating states of the optical space communication apparatuses to perform setups and manipulations. Note that data signal interfaces and cables for connecting the data signal interfaces to the optical space communication apparatuses are not illustrated in FIGS. 1 and 2.

In the conventional optical space communication apparatus described above, since the transmitted/received/data signals and the preliminarily modulated transmitted/received/data signals have a broadband, the lengths of the coaxial cables 5 and 8 which connect the main body head units 3 and 6 to the manipulating control units 4 and 7 are limited. The manipulating control units 4 and 7 for displaying the operating states of the optical space communication apparatuses cannot be installed on the data signal interface sides in positions desired by an operator.

SUMMARY OF THE INVENTION

It is an object of the present invention to solve the conventional problem described above, and provide an optical space communication apparatus capable of allowing an operator to confirm the operating state from a desired position and at the same time perform the operation start setup/manipulation and setup/manipulation during operation at this desired position.

In order to achieve the above object, there is provided an optical space communication apparatus installed remote from an opposing optical space communication apparatus by a predetermined distance to perform desired optical radio signal communications, wherein remote control means is set at an arbitrary position remote from the optical space communication apparatus, and interface means for communicating operating state information of the apparatus, operation start setup/manipulating information, and setup/manipulating information during operation of the apparatus is set in the optical space communication apparatus.

According to the present invention, there is also provided an optical space communication apparatus in which a transmission/reception optical head unit for converting an electrical signal into an optical signal and transmitting the optical signal to an opposing apparatus, and converting an optical reception signal from the opposing apparatus into an electrical signal is provided separately from a signal processing control unit for performing preliminary modulation, demodulation, and signal level conversion in order to efficiently communicate data signals, wherein remote control means is set at an arbitrary position remote from the optical space communication apparatus, and interface means for communicating operating state information of the apparatus, operation start setup/manipulating information, and setup/manipulating information during operation of the apparatus is set in the optical space communication apparatus.

DESCRIPTION OF THE PREFERRED EMBODIMENTS

The present invention will be described in detail with reference to the embodiments illustrated in FIGS. 3 to 8.

Figure 1:
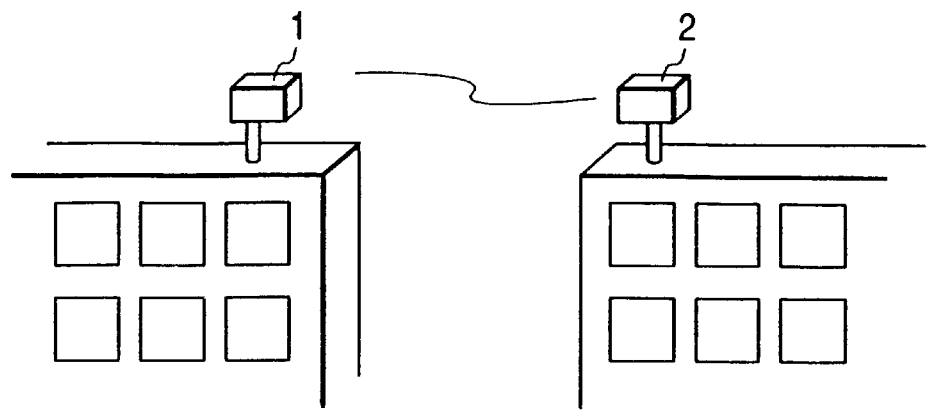
FIG. 1 is a view showing the arrangement of conventional optical space communication apparatuses.
Figure 2:
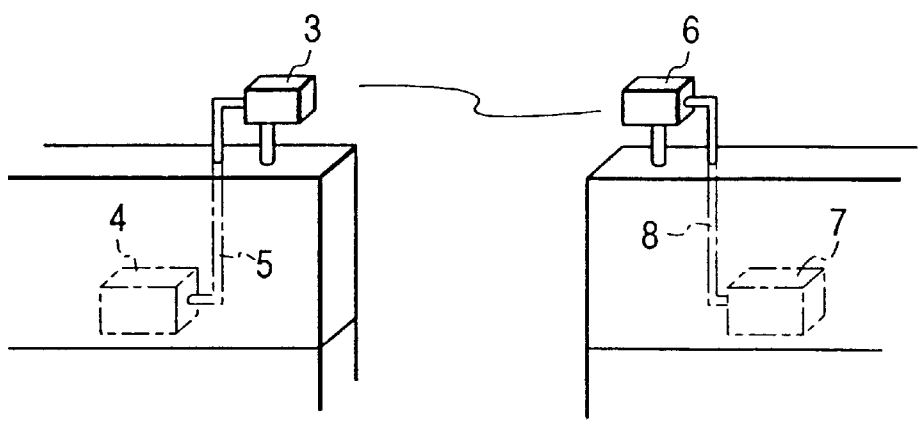
FIG. 2 is a view showing the arrangement of another conventional optical space communication apparatuses.
Figure 3:
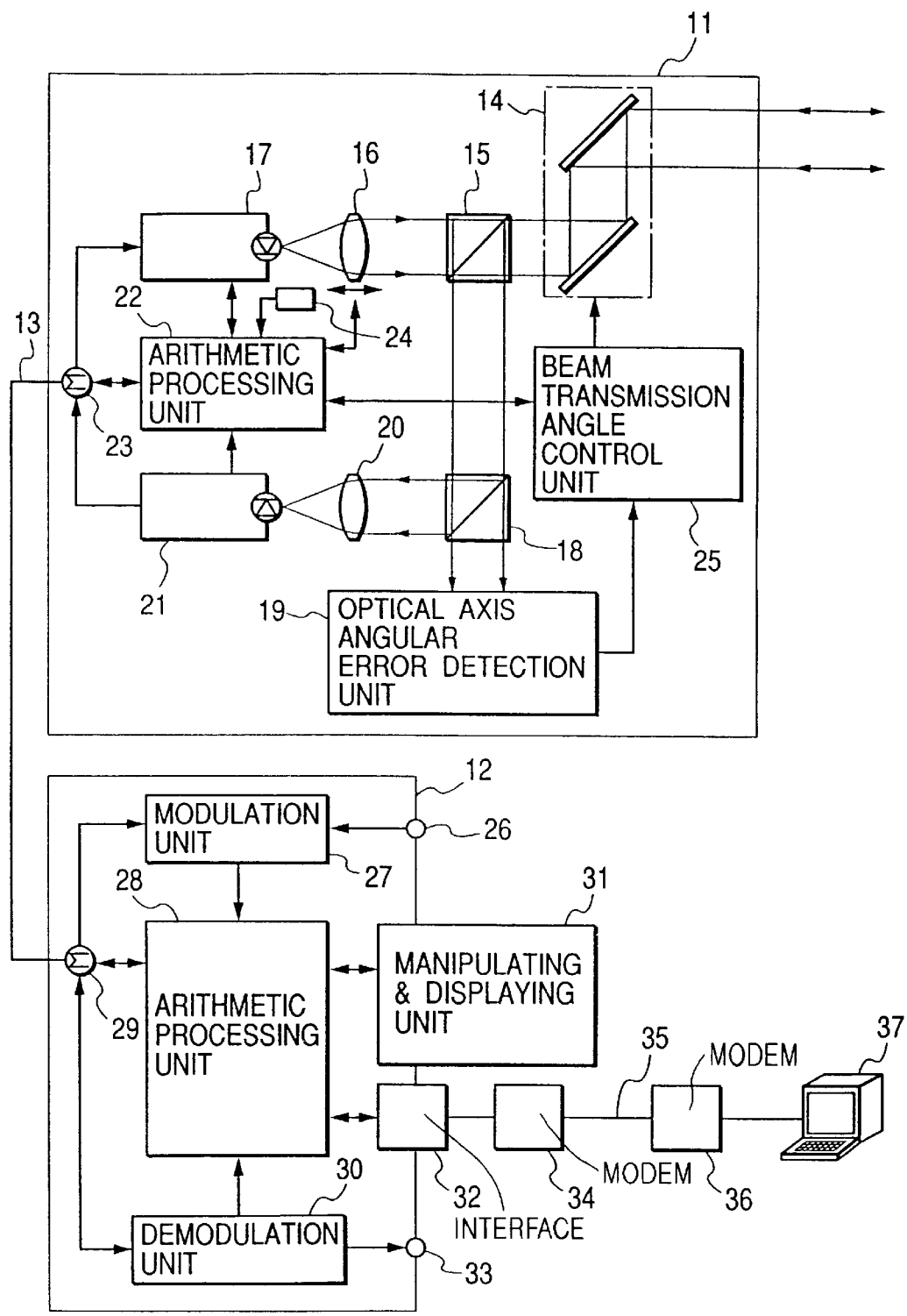
FIG. 3 is a block diagram of an optical space communication apparatus according to an embodiment of the present invention.

FIG. 3 shows the arrangement of an optical space communication apparatus according to an embodiment. This optical space communication apparatus comprises a main body head unit 11, a manipulating control unit 12, and a predetermined cable 13 which connects the units 11 and 12. An apparatus having the same arrangement as described above is located at a predetermined distance from the above apparatus to oppose it so as to perform optical radio information communication.

A beam transmission angle change means 14 is disposed at a position where a light beam is transmitted to or received from the opposing apparatus. A polarization beam splitter 15, an optical system 16, and an electro-optical conversion unit 17 are sequentially arranged in the reflection direction of the beam transmission angle change means 14. A beam splitter 18 and an optical axis angular error detection unit 19 are sequentially arranged in the reflection direction of the polarization beam splitter 15. An optical system 20 and a photo-electric conversion unit 21 are arranged in the reflection direction of the beam splitter 18.

An arithmetic processing unit 22 is assembled in the main body head unit 11. The arithmetic processing unit 22 is connected to the optical system 16, the electro-optical conversion unit 17, the photo-electric conversion unit 21, a wavelength multiplexer/demultiplexer 23, a temperature detection unit 24 for detecting the temperature of a predetermined portion in the apparatus, and a beam transmission angle control unit 25. The output from the photo-electric conversion unit 21 is connected to the wavelength multiplexer/demultiplexer 23. The output from the wavelength multiplexer/demultiplexer 23 is connected to the electro-optical conversion unit 17. The output from the optical axis angular error detection unit 19 is connected to the beam transmission angle change means 14 through the beam transmission angle control unit 25.

In the manipulating control unit 12, the output from a signal input unit 26 is connected to a modulation unit 27. The output from the modulation unit 27 is connected to an arithmetic processing unit 28 and a wavelength multiplexer/demultiplexer 29. The arithmetic processing unit 28 is connected to a demodulation unit 30, a manipulating and display unit 31 for performing setups and displaying the manipulation and state of the apparatus, and an RS232C interface 32. The output from the wavelength multiplexer/demultiplexer 29 is connected to a signal output unit 33 through the demodulation unit 30.

A personal computer 37 is connected to the RS232C interface 32 through a modem 34, a cable 35 serving as a private line and a wire public line or radio public channel, and a modem 36. The operator can remote-control the optical space communication apparatus by using this interface 32 and the personal computer 37.

With the above arrangement, in the manipulating control unit 12 of the optical space communication apparatus, an outgoing main signal to be transmitted to the opposing apparatus is input from the signal input unit 26, and is subject to preliminary modulation in the modulation unit 27 so as to efficiently transmit the main signal, and is input to the wavelength multiplexer/demultiplexer 29. This signal is sent to the main body head unit 11 of the optical space communication apparatus through the cable 13. The signal is input from the wavelength multiplexer/demultiplexer 23 to the electro-optical conversion unit 17 and converted into an optical signal. The optical signal has a predetermined divergence angle through the optical system 16. This optical signal passes through the polarization beam splitter 15 and is transmitted as transmission light from the beam transmission angle change means 14 to the opposing apparatus.

The incoming light beam transmitted from the opposing apparatus is incident as reception light on the beam transmission angle change means 14 and reflected by the polarization beam splitter 15 and then the beam splitter 18. The reflected beam is focused on the photo-electric conversion unit 21 through the optical system 20 and converted into an electrical signal. The electrical signal is input to the wavelength multiplexer/demultiplexer 23. This signal reaches the wavelength multiplexer/demultiplexer 29 of the manipulating control unit 12 via the cable 13. The signal is then demodulated by the demodulation unit 30 and output from the signal output unit 33 as a main signal.

The reception light transmitted through the beam splitter 18 is guided to the optical axis angular error detection unit 19 to detect any angular error between the light transmission direction of the present apparatus serving as the light reception unit and the optical path of the reception light from the opposing apparatus. The beam transmission angle control unit 25 drives the beam transmission angle change means 14 on the basis of the detection information, thereby matching the optical axis of the light reception unit with that of the reception light.

The arithmetic processing unit 22 of the main body head unit 11 receives temperature information of the predetermined portion in the apparatus from the temperature detection unit 24, transmission signal power information and transmission light power information from the electro-optical conversion unit 17, reception signal power information and reception light power information from the photo-electric conversion unit 21, the divergence angle information of the transmission light beam from the optical system 16, light beam transmission angle information and optical axis angular error information from the beam transmission angle control unit 25, and the like and detects the operating state of the optical space communication apparatus. The arithmetic processing unit 22 also outputs the transmission signal power information and the transmission light power information to the electro-optical conversion unit 17, the transmission light beam divergence angle information to the optical system 16, the light beam transmission angle information to the beam transmission angle control unit 25, and the like, thereby performing operation start setups and manipulations during operation.

The arithmetic processing unit 28 in the manipulating control unit 12 receives operator's setup and manipulating signals from the manipulating and displaying unit 31 and outputs the operating state signal to the manipulating and displaying unit 31. The arithmetic processing unit 28 checks, from the modulation unit 27 and the demodulation unit 30, the presence/absence of the main signal to be transmitted and the presence/absence of the main signal received, respectively. The arithmetic processing unit 22 in the main body head unit 11 and the arithmetic processing unit 28 in the manipulating control unit 12 exchange signals through the wavelength multiplexers/demultiplexers 23 and 29 and the cable 13. If no signal lines for exchanging these signals are prepared in the cable 13, the carrier wave is modulated by these signals to assign different frequency bands to the transmitting/received main signals. The modulated carrier wave is multiplexed with the transmission or reception main signal, and the multiplexed signal can be communicated in the cable 13.

According to the general arrangement, the main body head unit 11 of the optical space communication apparatus is installed on the rooftop of a building, the manipulating control unit 12 is installed indoors, and the main body head unit 11 and the manipulating control unit 12 are connected via the cable 13. However, since the length of the cable 13 has some limitation, the manipulating control unit 12 is often arranged on the interface side.

Optical space communication greatly depends on the weather such as rain and mist. Since light is communicated in the form of a beam, the direction of the apparatus main body may shift due to wind or vibration acting on the apparatus, and communication may not be performed in an optimal state. For this reason, the operator must always grasp the operating state in optical space communication. If a trouble is likely to occur in communication, the operator must immediately recognize this and take a measure such as correction of the installation direction of the apparatus. In the worst case, a backup system must be activated.

In this embodiment, to remote-control the optical space communication apparatus, the RS232C interface 32 which serves as the interface means and the personal computer 37 or optical space communication apparatus remote control device which serves as the remote control means installable on the operator side are provided. The interface 32 receives the apparatus operating state information from the arithmetic processing unit 28 and externally outputs it and sends externally input operation start setup/manipulating information and setup/manipulating information during operation to the arithmetic processing unit 28. The arithmetic processing unit 28 can arbitrarily set the priority order for the commands respectively from the setuping manipulating and displaying unit 31 and the interface 32. The interface 32 can be connected to the private line of the cable 35 and the wire public line or radio public channel (e.g., a PBX line, an extension connected to the PBX, or a network such as a LAN) via the RS232C cable and the modem 34 and can exchange information anywhere on the globe.

The operating state information of the optical space communication apparatus from the RS232C interface 32 is displayed with good readability in the personal computer 37 located at a position desired by the operator. Setup/manipulating information to the apparatus can be input from the personal computer 37. When the personal computer 37 is connected to the public or private line via the RS232C interface of the personal computer 37 and the modem 36, the personal computer 37 can exchange information with the interface 32 in the manipulating control unit 12. If it is not efficient or economical to always connect the personal computer 37 to the interface 32 via the public or private line, the following arrangement can be used. That is, when a trouble is likely to occur in communication due to bad weather or an external factor, the optical space communication apparatus can be connected to the personal computer 37 by automatic calling via the interface 32, and the personal computer 37 can generate an alarm beam or sound.

Figure 4:
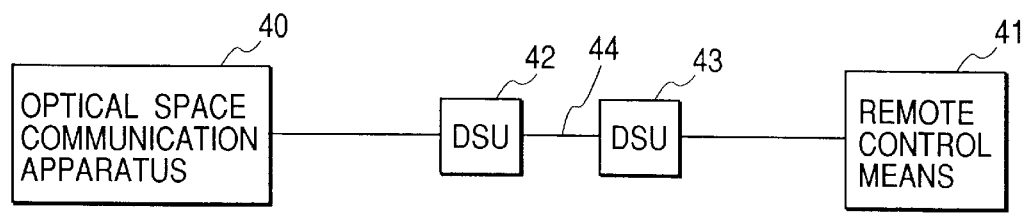
FIG. 4 is a block diagram of another remote control means.
Figure 5:
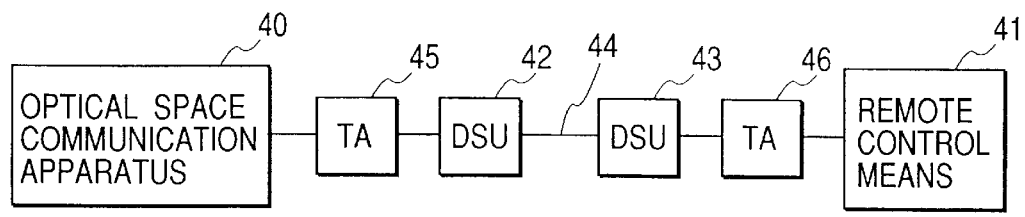
FIG. 5 is a block diagram of still another remote control means.

FIGS. 4 and 5 show another embodiment of the remote control means. An optical space communication apparatus is connected to the remote control means via a public or private digital line using a DSU or terminal adapter. In FIG. 4, an optical space communication apparatus 40 and a remote control means 41 are connected to DSUs 42 and 43, respectively, and the DSUs 42 and 43 are connected to each other via a digital line 44. In FIG. 5, terminal adapters 45 and 46 are interposed between an optical space communication apparatus 40 and a DSU 42 and between a remote control means 41 and a DSU 43. The interfaces on the optical space communication apparatus 40 side and the remote control means 41 side change depending on whether the optical space communication apparatus 40 and the remote control mean 41 are connected to the DSUs 42 and 43 directly or via the terminal adapters 45 and 46.

In optical space communication, a predetermined reception signal power level for performing desired optical communication is defined. Assume that the light amount is reduced on the communication path due to rain or mist, and the reception signal power level drops due to the decrease in reception light power level and reaches the defined level. In this case, for example, the transmission light beam divergence angle may be decreased on the transmitting side to increase the reception efficiency on the receiving side. In addition, within an allowable range, the transmission light power can be increased, or the degree of modulation of the optical transmission main signal can be increased on the transmitting side to substantially increase the transmission signal power.

When the transmission direction has changed due to bad apparatus installation conditions and/or wind and vibration, and the reception signal power drops in the opposing apparatus, the light beam transmission angle must be adjusted to an optimal state. In an apparatus having a function of detecting and correcting any angular error between the light reception unit and the optical path of the reception light from the opposing apparatus, when the posture of the apparatus has changed due to wind and vibration, the change can be corrected in the apparatus. However, when the change amount is large, the allowable change range of the light beam transmission angle reaches its limit, and the correctable angle range in a certain direction narrows down.

Even if this state occurs during operation, the operator does not notice this because there is no visible sign. When the correctable angle range in the certain direction narrows down, correction for vibration in this direction cannot be made, and it is difficult for the optical space communication apparatus to assure desired performance. To prevent this, the state of the beam transmission angle change means 14 must be monitored, the posture of the apparatus must be so corrected as to prevent the above problem, and the state of the beam transmission angle change means 14 must be maintained in the optimal state.

In the optical space communication apparatus, it is important to grasp the operating state such as the reception signal power and light beam transmission angle which are unique to optical space transmission, the transmission light power, the transmission signal power, the temperature of the predetermined portion in the apparatus, the presence/absence of transmission main signal input, and the presence/absence of the reception main signal output. If a great change in operating state occurs, it is important to take a measure corresponding to such change. In this embodiment, the operating state of the optical space communication apparatus is always checked using the remote control means at a position desired by the operator. Therefore, a measure for a great change in operating state can be immediately taken.

The connection between the optical space communication apparatus and the remote control means located at an arbitrary position may be achieved by directly connecting the RS232C interface 32 and the personal computer 37 via an RS232C cross cable. When the interface 32 comprises a 10BASE-T hub, the interface 32 can be connected to a network board such as an Ethernet board and can be connected to a network via the public or private line. The above means can be connected in a multi-stage configuration.

Figure 6:
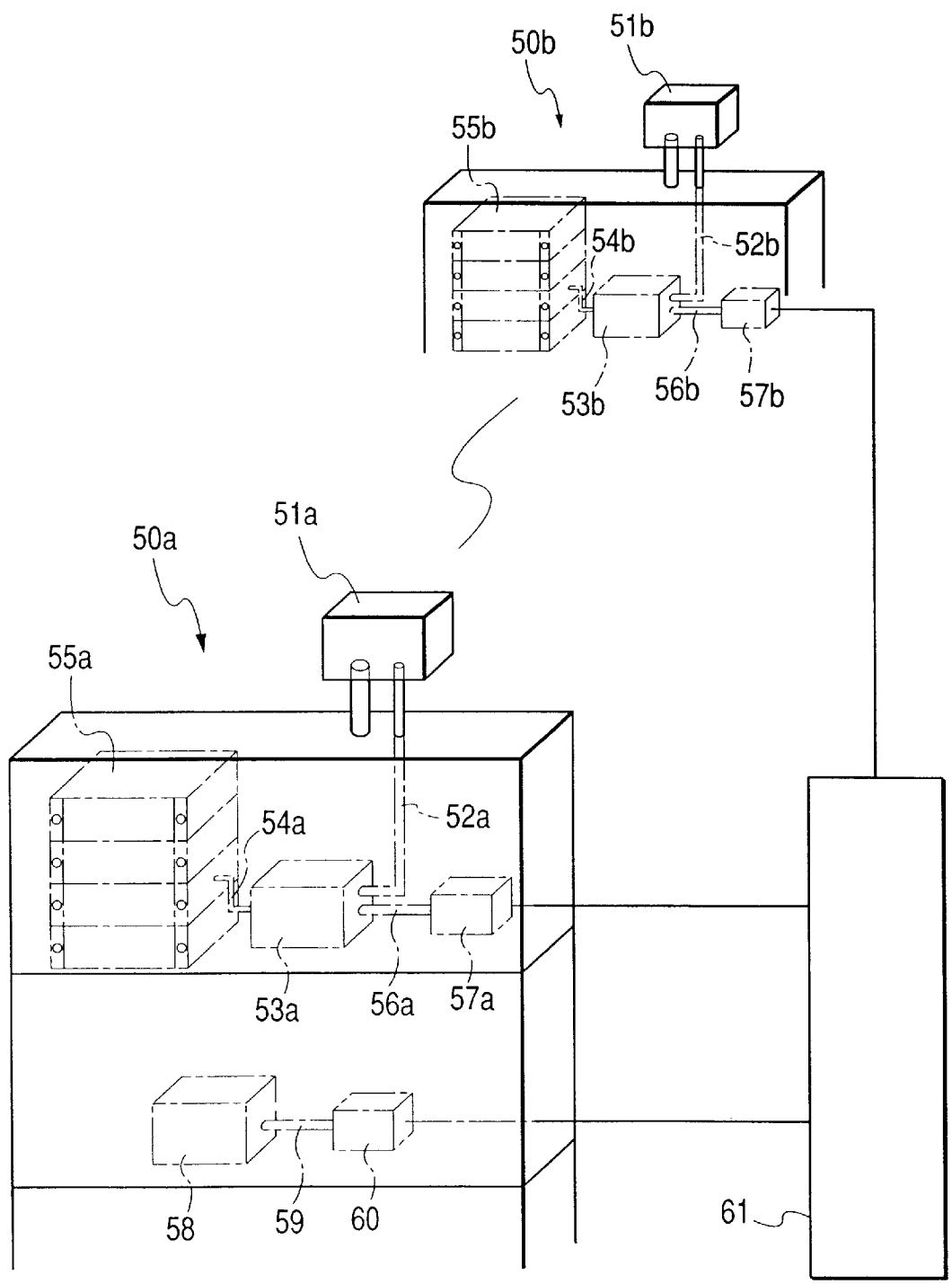
FIG. 6 is a view for explaining the connection between the optical space communication apparatus and the remote control means.

FIG. 6 is a view showing the layout when two opposing optical space communication apparatuses are controlled by one remote control means. The outputs of main body head units 51*a* and 51*b* of optical space communication apparatuses 50*a* and 50*b* are connected to manipulating control units 53*a* and 53*b* via predetermined cables 52*a* and 52*b*, respectively. The outputs of the manipulating control units 53*a* and 53*b* are connected to device for exchanging the main signal 55*a* and 55*b* for interfacing the main signals via main signal cables 54*a* and 54*b*, and to modems 57*a* and 57*b* via RS232C cables 56*a* and 56*b*, respectively. The output of a remote control means 58 is connected to a modem 60 via an RS232C cable 59. The outputs of the modems 57*a*, 57*b*, and 60 are connected to a public or private analog line 61.

The optical space communication apparatus 50*a* and the optical space communication apparatus 50*b* installed to oppose the apparatus 50*a* are controlled by one remote control means 58. Optical space communication is performed by the main body head units 51*a* and 51*b*. The manipulating control units 53*a* and 53*b* exchange the main signals via the device for exchanging the main signal 55*a* and 55*b*, respectively. At this time, the remote control means 58 performs remote control by the analog line 61 via the modems 57*a*, 57*b*, and 60.

Figure 7:
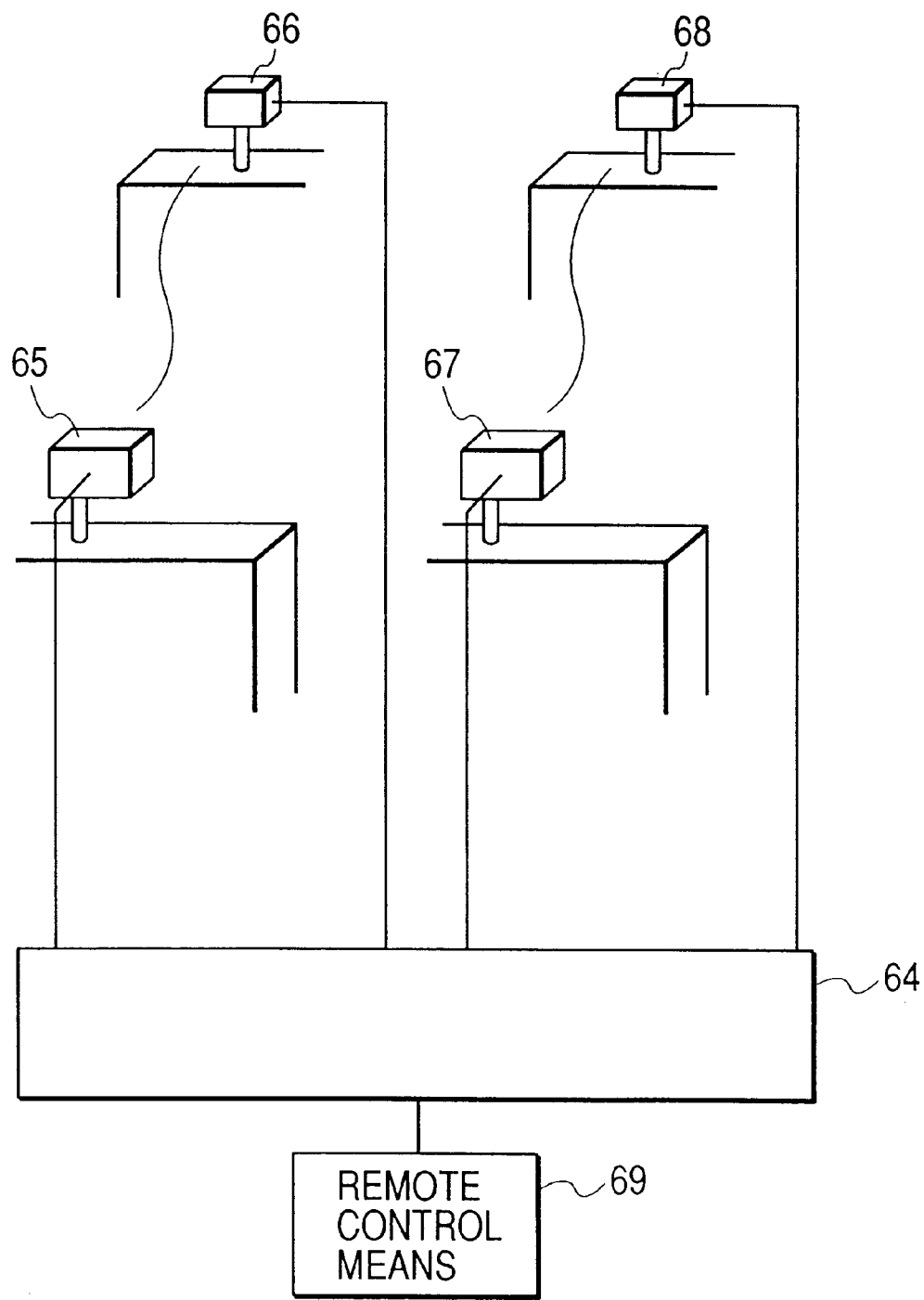
FIG. 7 is a view for explaining the connections between the remote control means and a plurality of optical space communication apparatuses.

FIG. 7 is a view showing the layout when a plurality of optical space communication apparatuses are remote-controlled. The outputs of a plurality of optical space communication apparatuses 65, 66, 67, and 68 whose addresses are known on, e.g., a network 64 are connected to one remote control means 69 whose address is also known in the same manner as described above.

Even in the plurality of optical space communication apparatuses connected via a connection means such as a network, the apparatus operating state information, the operation start setup/manipulating information, and the setup/manipulating information during operation are exchanged. The exchange of the operating state information of each apparatus, the operation start setup/manipulating information of each apparatus, and the setup/manipulating information during operation of each apparatus between the remote control means 69 and the optical space communication apparatuses 65 to 68 can be confirmed on the operator side.

Assume that the network 64 is an analog line and is connected via a modem and an analog public line, and the telephone numbers of the optical space communication apparatuses 65 to 68 and the remote control means 69 are known. In this case, whenever the operator deems it necessary or when a trouble is likely to occur in each apparatus due to bad weather or an external factor, the remote control means 69 automatically calls the optical space communication apparatuses or each of the optical space communication apparatuses 65 to 68 automatically calls the remote control means 69. When a line connection request is sent from the optical space communication apparatus 65 to the remote control means 69 while the remote control means 69 is connected to the optical space communication apparatus 68, the request is denied because the remote control means 69 is busy. In view of this, a function of retrying the connection upon a lapse of an arbitrary period must be provided, or a plurality of telephone lines must be prepared, as needed.

Figure 8:
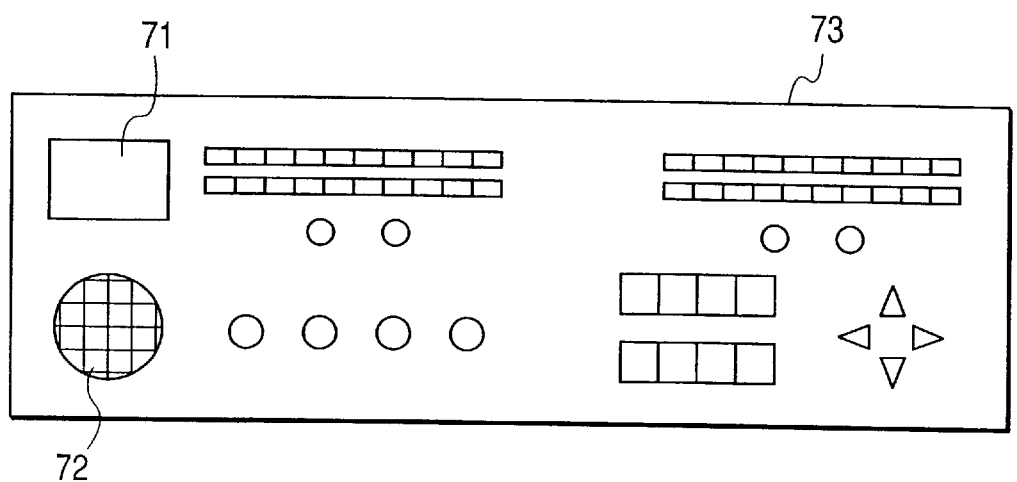
FIG. 8 is a view for explaining the front panel of an optical space communication apparatus remote control means.
Figure 9:
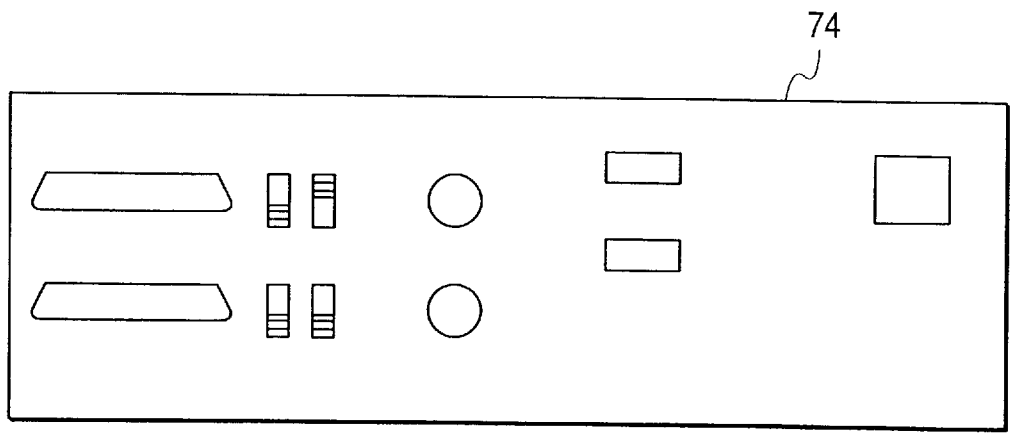
FIG. 9 is a view showing a rear panel.

When an optical space communication apparatus remote control device shown in FIGS. 8 and 9 is used, the components are layed out as follows. A state displaying unit for displaying the optical space communication apparatus operating state such as the reception light power, the reception signal power, the transmission light power, the transmission signal power, and the light beam transmission angle, a setup and manipulating unit for performing operation start setup/manipulation and setup/manipulation during operation such as the light beam transmission angle and the transmission light beam divergence angle, an alarm buzzer 72, and the like are mounted on a front panel 73, as shown in FIG. 8. The power supply unit of the remote control device, an interface suitable for the installation positions of the optical space communication apparatus and the remote control device, and the like are mounted on a rear panel 74, as shown in FIG. 9.

With the above arrangement, no limitations are imposed on the connection method of connecting the optical space communication apparatuses 65 to 68 and the remote control means 69 using a commercially available personal computer, and the functional aspect of the remote control means 69. A simple remote control means 69 suitable for the optical space communication apparatuses 65 to 68 and having high degree of freedom in design can be realized. For example, the optical space communication apparatus can be connected to the remote control device via only a signal line, and a cable is connected between them to achieve inexpensive installation.

Figure 10:
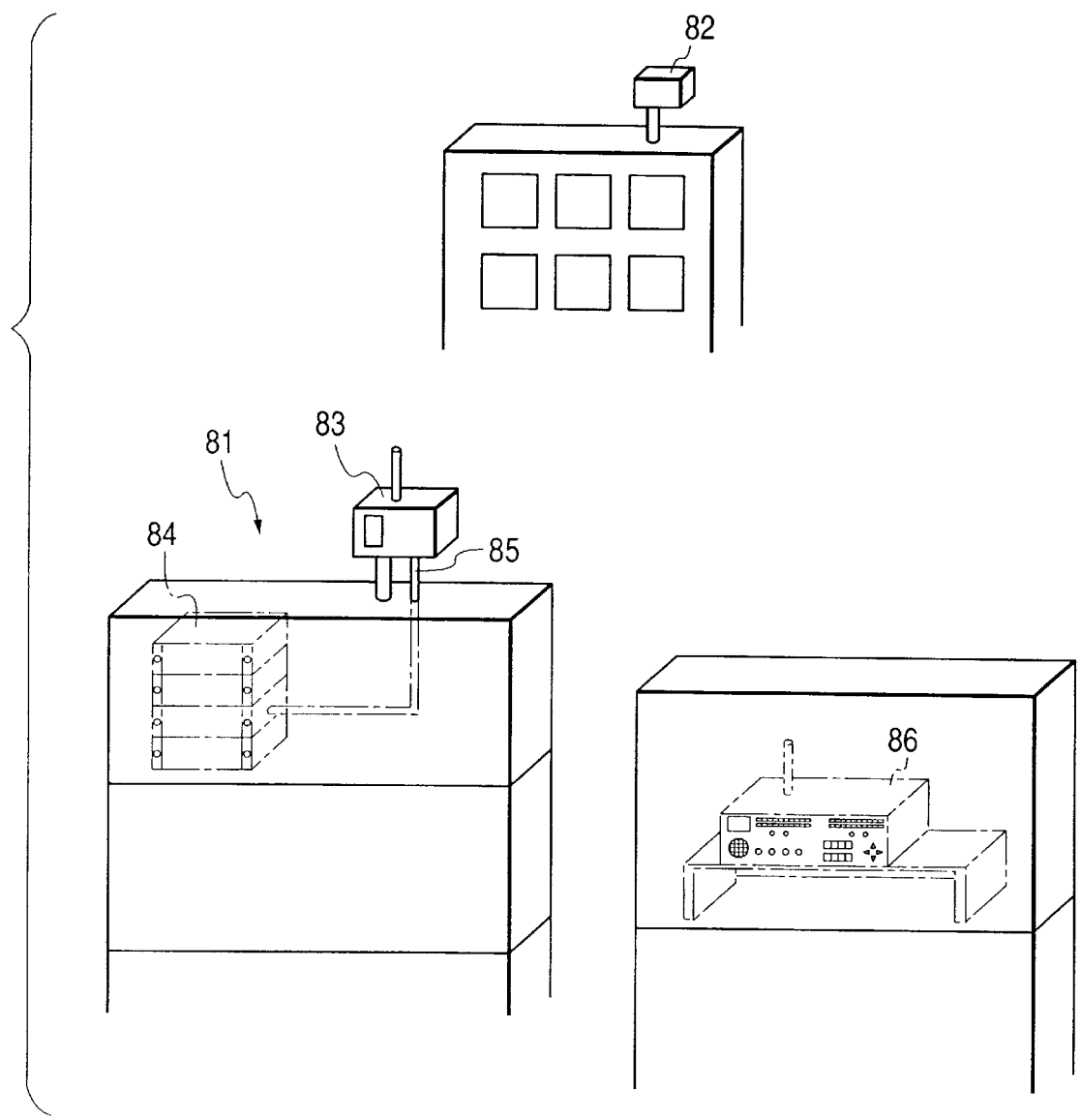
FIG. 10 is a view for explaining radio connection between the optical space communication apparatus and the remote control means.

FIG. 10 is a view showing the layout when radio remote control using a radio wave or light is performed. This layout is effective for optical space communication apparatuses each integrally having a main body head unit and a manipulating control unit. Two optical space communication apparatuses 81 and 82 oppose each other through a space. In each optical space communication apparatus, a main body head unit 83 is connected to a device for exchanging the main signal 84 via a predetermined cable 85. An optical space communication apparatus remote control device 86 is installed at a predetermined position on the operator side.

The operating state information signals, operation start setup/manipulating information signals, setup/manipulating information signals during operation of the optical space communication apparatuses 81 and 82 are exchanged between the remote control device 86 and the optical space communication apparatuses 81 and 82 by radio using a radio wave or light. The optical space communication apparatuses 81 and 82 need not always be connected to the remote control device 86. It is possible to connect the optical space communication apparatus 81 or 82 to the remote control device 86, whenever the operator deems it necessary or when any trouble is likely to occur in communication due to bad weather or external factor. A function of helping the operator easily recognize the trouble with an alarm beam or sound may be provided to the remote control device.

In the present invention, the optical axis of a light transmission unit is matched with that of a light reception unit beforehand and there are provided a function for detecting and correcting any angular error between the optical axis of the light reception unit and the optical path of the reception light from the opposing apparatus, and a function of changing the transmission light beam divergence angle. The objective of the present invention is an apparatus for performing two-way (bidirectional) optical space communication. The present invention is also applicable to an optical space communication apparatus having neither the function of detecting and correcting angular error nor the function of changing the transmission light beam divergence angle, an optical space communication apparatus for performing one-way optical space communication, or an optical space communication apparatus integrally having a main body head unit and a manipulating control unit.

As has been described above, an optical space communication apparatus according to the present invention comprises interface means for interfacing information between the apparatus and a remote control means located at an arbitrary position and remote from the apparatus. The remote control means can be installed at a position different from the data signal interface position. The operating state of the apparatus can be confirmed by the operator at a desired position, and at the same time, operation start setup/manipulation and setup/manipulation during operation can be performed at the position desired by the operator.

In an optical space communication apparatus according to the present invention, a light transmission optical head unit is separated from a signal processing control unit, and a remote control means for exchanging information between the remote control means and the apparatus is installed at an arbitrary position remote from the apparatus. Signals having a much lower speed and a much narrower communication band than those of main signals can be used. The limitation on the length of the cable can be relaxed, and the remote control means can be installed at another position through a public line or by radio. The operator can confirm the operating state at a desired position, and operation start setup/manipulation and setup/manipulation during operation can be performed at the desired position.

What is claimed is:

1. An optical space communication apparatus for performing optical radio information communication, comprising:
    an optical space communication device having a light transmitting/receiving head unit and a manipulating control unit which are provided at an arbitrary position remote from each other and which are connected to each other via a cable;
    remote control means located at an arbitrary position remote from the light transmitting/receiving head unit and the manipulating control unit; and
    interface means for exchanging, with said remote control means, operating state information of said device, operation start setup/manipulating information of said device, or setup/manipulating information during operation of said devices.

2. An apparatus according to claim 1, wherein the operating state information interfaced with said remote control means is at least one of a transmission light power, a transmission signal power, a reception light power, a reception signal power, a light beam transmission angle, a temperature of a predetermined portion in said apparatus, an angular error between reception light and an optical axis of a light reception unit in said apparatus, a transmission light beam divergence angle, the presence/absence of a transmission main signal input, and the presence/absence of a reception main signal output.

3. An apparatus according to claim 1, wherein one of the operation start setup/manipulating information and the setup/manipulating information during operation which are interfaced with said remote control means is at least one of a light beam transmission angle, a transmission light beam divergence angle, a transmission light power, and a transmission signal power.

4. An apparatus according to claim 1, wherein the information is interfaced with said remote control means via one of a public line and a private line.

5. An apparatus according to claim 1, wherein the information is interfaced with said remote control means using a radio signal.

6. An apparatus according to claim 1, wherein the information is interfaced with said remote control means using another optical radio means.

7. An apparatus according to claim 1, wherein when a trouble is likely to occur in optical space communication, a line between said apparatus and said remote control means is being connected.

8. An apparatus according to claim 1, wherein when a trouble is likely to occur in optical space communication, said remote control means generates one of alarm light and sound.

9. An apparatus according to claim 1, wherein said remote control means interfaces the operating state information and the operation start setup/manipulating information or the setup/manipulating information during operation with a plurality of optical space communication apparatuses connected via one of a public line, a private line, a radio channel, a channel of optical radio means different from that of said apparatus.

10. An optical space communication apparatus for performing optical radio information communication, comprising:
    an optical space communication device having a light transmitting/receiving head unit and a manipulating control unit which are provided remote from each other and which are connected to each other via a cable;
    remote control means located remote from the light transmitting/receiving head unit and the manipulating control unit; and
    interface means for communicating between said remote control means and said optical space communication device.

11. An apparatus according to claim 10, wherein operating state information interfaced with said remote control means is at least one of a transmission light power, a transmission signal power, a reception light power, a reception signal power, a light beam transmission angle, a temperature of a predetermined portion in said apparatus, an angular error between reception light and an optical axis of a light reception unit in said apparatus, a transmission light beam divergence angle, the presence/absence of a transmission main signal input, and the presence/absence of a reception main signal output.

12. An apparatus according to claim 10, wherein one of operation start setup/manipulating information and setup/manipulating information during operation which are interfaced with said remote control means is at least one of a light beam transmission angle, a transmission light beam divergence angle, a transmission light power, and a transmission signal power.

13. An apparatus according to claim 10, wherein the information is interfaced with said remote control means via one of a public line and a private line.

14. An apparatus according to claim 10, wherein the information is interfaced with said remote control means using a radio signal.

15. An apparatus according to claim 10, wherein the information is interfaced with said remote control means using another optical radio means.

16. An apparatus according to claim 10, wherein when a trouble is likely to occur in optical space communication, a line between said apparatus and said remote control means is being connected.

17. An apparatus according to claim 10, wherein when a trouble is likely to occur in optical space communication, said remote control means generates one of alarm light and sound.

18. An apparatus according to claim 10, wherein said remote control means interfaces operating state information and operation start setup/manipulating information or setup/manipulating information during operation with a plurality of optical space communication apparatuses connected via one of a public line, a private line, a radio channel, a channel of optical radio means different from that of said apparatus.

* * * * *

UNITED STATES PATENT AND TRADEMARK OFFICE
CERTIFICATE OF CORRECTION

PATENT NO. : 6,493,122 B1  Page 1 of 1
DATED : December 10, 2002
INVENTOR(S) : Degura It is certified that error appears in the above-identified patent and that said Letters Patent is hereby corrected as shown below:

Column 5,
Line 31, "setuping" should read -- setup --.

Column 9,
Line 37, "devices." should read -- device. --; and
Line 67, "being" should be deleted.

Column 10,
Line 10, "a channel" should read -- or a channel --;
Line 54, "being" should be deleted; and
Line 64, "a channel" should read -- or a channel --.

Signed and Sealed this

Ninth Day of December, 2003

JAMES E. ROGAN
*Director of the United States Patent and Trademark Office*